April 20, 1926. 1,581,697
E. STÖCKEMANN
DEVICE FOR PRODUCING A CONSTANT CUTTING SPEED
OF LATHES AND OTHER MACHINE TOOLS
Filed Sept. 5, 1922 2 Sheets-Sheet 1
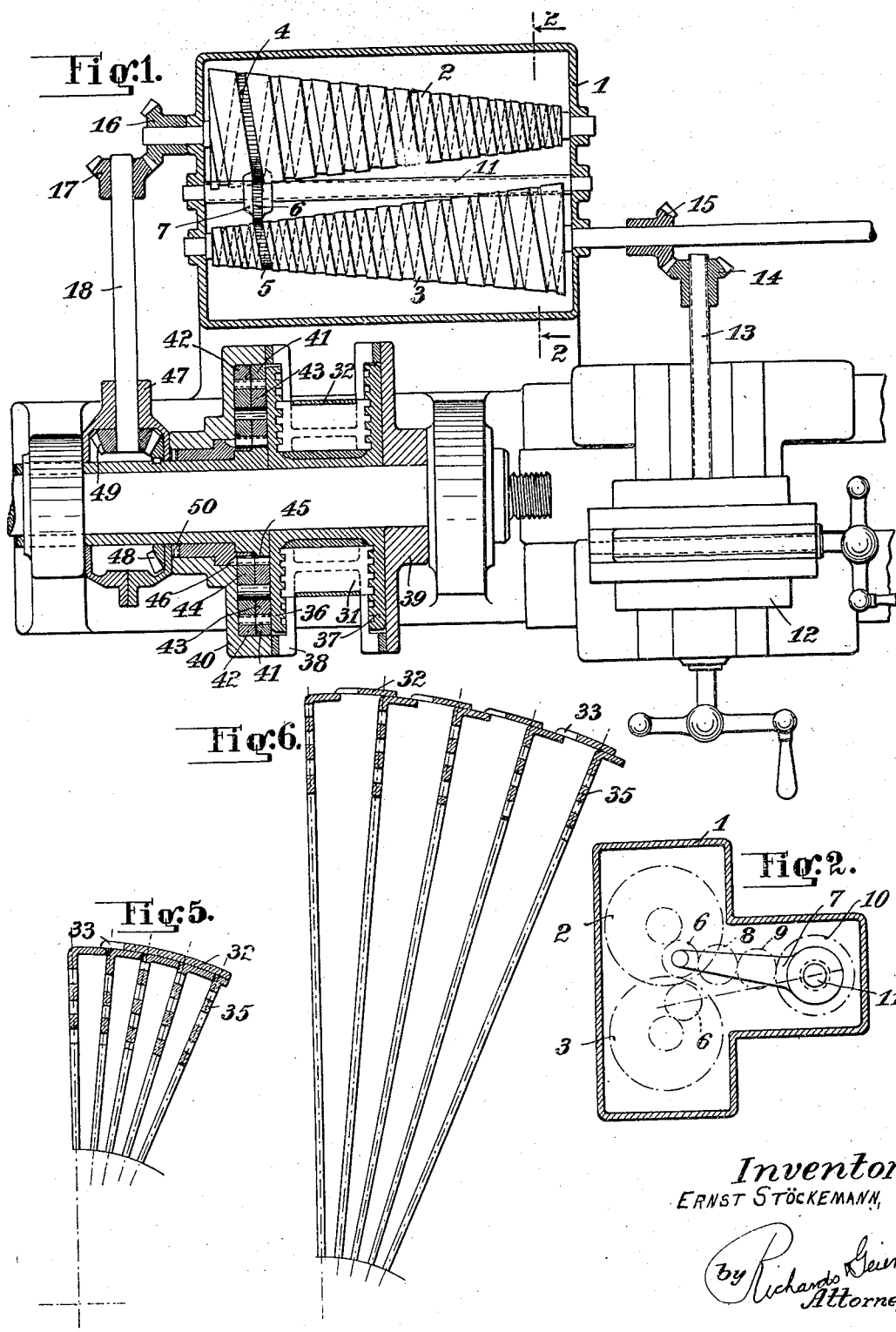
Inventor
ERNST STÖCKEMANN,
by Richards Geist
Attorney.

April 20, 1926.
E. STÖCKEMANN
1,581,697
DEVICE FOR PRODUCING A CONSTANT CUTTING SPEED
OF LATHES AND OTHER MACHINE TOOLS
Filed Sept. 5, 1922    2 Sheets-Sheet 2
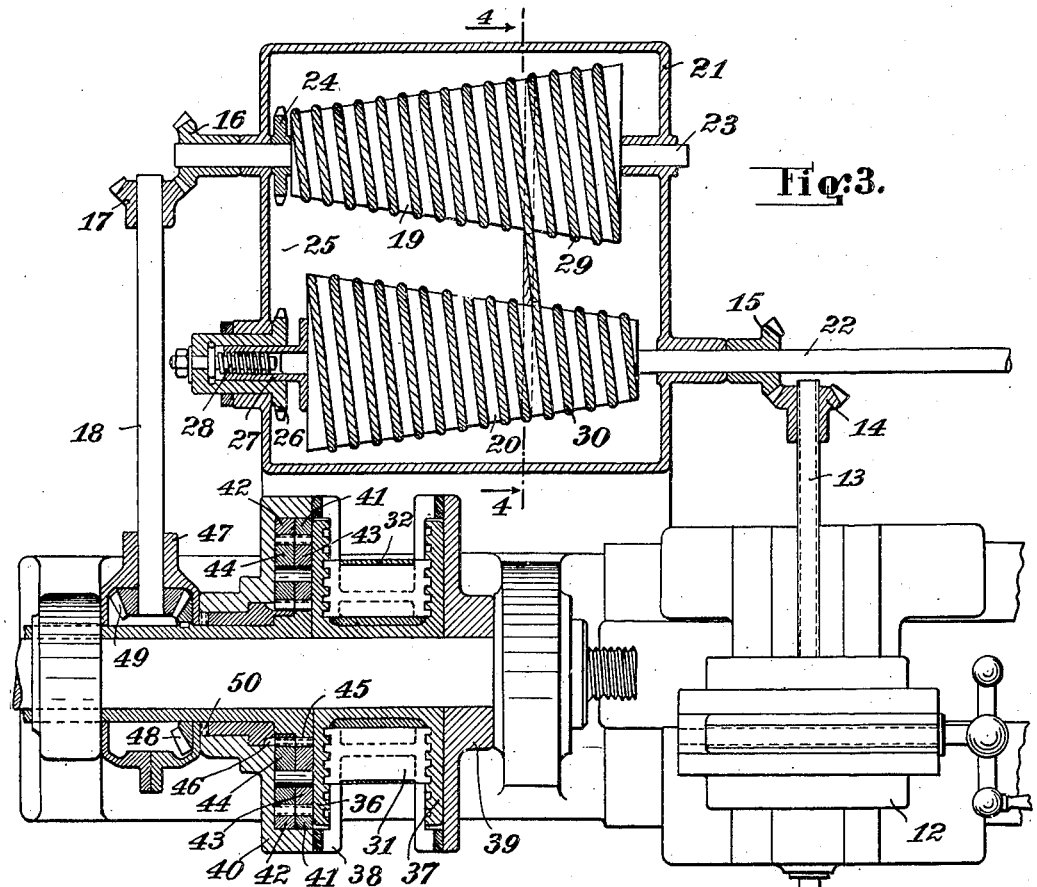
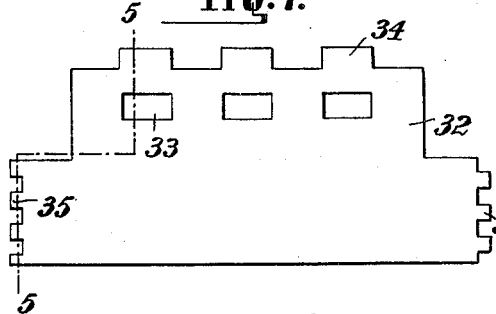
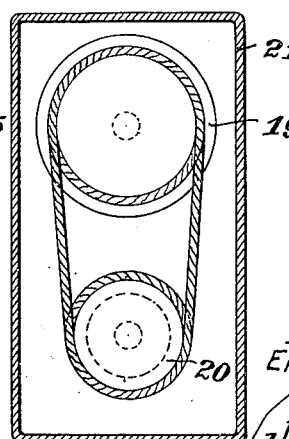
Inventor
ERNST STÖCKEMANN,
by Richards & Geier
Attorney.

Patented Apr. 20, 1926.

1,581,697

UNITED STATES PATENT OFFICE.

ERNST STÖCKEMANN, OF BERLIN-TEMPELHOF, GERMANY.

DEVICE FOR PRODUCING A CONSTANT CUTTING SPEED OF LATHES AND OTHER MACHINE TOOLS.

Application filed September 5, 1922. Serial No. 586,120.

*To all whom it may concern:*

Be it known that I, ERNST STÖCKEMANN, of German nationality, residing at Berlin-Tempelhof, Germany, have invented certain new and useful Improvements in and Relating to Devices for Producing a Constant Cutting Speed of Lathes and Other Machine Tools; and I do hereby declare the following to be a full, clear, and exact description of the invention, of which the following is a specification.

Various attempts have previously been made to regulate mechanically the revolving of the working spindle of a lathe during the face-turning by means of suitable gearings in such a manner that the cutting speed of the working tool remains always constant. The gearings used for this purpose were mostly friction wheel gearings or conical drum gearings. Apart therefrom that by means of the gearings of this kind which up to now have become known a transmission of great power cannot be effected the object of these gearings is achieved in a highly unsatisfactory manner only. By means of these regulating gearings which, owing to the uniform movement of the feeding spindle for the working tool are directly adjusted, the turning movement of the working spindle is not regulated in such a manner that the increase or decrease of its turning velocity is in the same proportion as the increase or decrease of the turning diameter at which the advanced tool is applied. If the correct regulating should be achieved with the aid of the heretofore known friction wheel gearing the friction roller would always have to be applied at such a diameter of the friction wheel which corresponds to the diameter at which the tool is working. The friction roller would therefore have to be moved in a manner corresponding accurately to that of the tool. Such a gearing cannot be employed for the reason that in case of machinery work pieces of a small diameter the point of application of the friction roller would come so near to the centre of the friction wheel that the friction would not suffice in order to turn the machine. In case of the gearings consisting of conical drums there is no possibility in order to produce by means of a uniform moving of the driving belt a rotation of the working spindle which changes in the same proportion as the radius of the turning diameter.

By means of the present invention a regulating device is obtained through which in conjunction with a change speed gear, consisting for instance of adjustable belt pulleys a cutting speed is produced in case of a face turning which regulates itself automatically and which remains constant.

In the accompanying drawings a device constructed according to the invention for producing a constant cutting speed is shown by way of example.

Figure 1, a longitudinal section through the device,

Figure 2, a cross section along the line 2—2 of Figure 1,

Figure 3 is a longitudinal section of another modification of the device.

Figure 4 is a section on the line 4—4 of Figure 3.

Figure 5 is a section on the line 5—5 of Figure 7, part of the rim consisting of separate lamellæ of the belt pulley on a larger scale when adjusted to the smallest diameter.

Figure 6 shows the same when adjusted to the largest diameter.

Figure 7 shows a plate cut to the shape of the lamella, and

Figure 8 is a plan of a ready bent lamella.

The two conical drums 19 and 20 are with regard to their longitudinal axis supported in the casing 21 parallel to each other. The casing is attached to the machine tool.

The drum 20 is mounted on the axle 22 in a slidable manner. On the axle 23 of the drum 19 the chain wheel 24 is fixed which by means of a chain 25 is connected to the chain wheel 26 mounted on the casing wall. In the bore of the hub of the chain wheel 26 which serves as a bearing for the nut 27 rigidly connected to the drum 20 the threaded spindle 28 is fixed. This threaded spindle is screwed into the nut 27 which is rigidly connected to the drum 20.

The cover faces of the drums 19 and 20 are fitted with helical rope grooves into which ropes 29 and 30 which may be of wire are placed. The wire rope 29 is attached with one end to the largest diameter of the drum 19 and with its other end to the largest diameter of the drum 20. The wire rope 30 however is fastened with one end to the smallest diameter of the drum 19 and with its other end to the smallest diameter of the drum 20. The driving of the regulating gear is effected through the conical wheels 14 and 15 from the spindle 13 of the support 12 as in case of the modification according to Figures 1 and 2. From the axle 23 of the drum 19 the transmission of the adjustment to the adjustable belt pulley is effected.

If the drum 20 is rotated by the conical wheel 15, both wire ropes are simultaneously and reciprocally according to the direction of rotation wound or unwound from one roller on to the other serving at the same time as a driving means for the drum 19.

As in consequence of the difference in the diameters of the drums facing each other the continuation of the winding in an axial direction takes place quicker on the smaller diameter than on the larger one, the drums 19 and 20 must be moved with regard to each other in an axial direction in order to compensate the difference of the consecutive movement of the wire ropes on the drums. This movement is effected by the chain wheel gearing 24, 25, 26 with the aid of the threaded spindle 28 rigidly supported in the hub of the chain wheel 26, for when the drum 19 is rotated with the aid of the wire ropes 29 and 30, also the chain wheel 24 fixed on the axle 23 and by means of the chain 25 the chain wheel 26 is turned in the same direction. In the same manner the threaded spindle 28 rigidly connected to the chain wheel 26 follows the rotation. As the thread of the threaded spindle 28 has the same angle of inclination and direction as the rope-grooves on the cover faces of the drums, the drum 20 on the axle 22 up on a turning of the drum is moved by the difference of the displacement of the wire rope windings by means of the nut 27 rigidly mounted on the drum 20 so that winding off and on of the wire ropes takes place always at the same angle. Through the conical wheels 16 and 17 and the shaft 18 the movement is transmitted to the adjustable belt pulley-drive 31. The diameter of the latter is changeable.

All adjustable belt pulleys which have become known up to now could fulfill their object in an imperfect manner only, as in consequence of the far too small number of the adjustable disc rim parts in case of greater adjustments the disc rim becomes non-circular. Also with those constructions where the belt supporting face consists of a folding metal strip, a circular running of the disc rim is not possible in case of larger adjustments.

In consequence of this becoming non-circular of the disc rim when adjusting larger diameters and in consequence of this mostly difficult and tedious adjustment the hitherto known adjustable discs could not be used for machine tools. With a machine tool the adjustment must be effected quickly and if possible while the machine is running, shall the adjustability of the discs be of any advantage at all. Non-circular running belt pulleys cannot be used at all for machine tools, as the variations of the loads on the belts which accompany the non-circular running of the discs are transmitted to the work piece and make an accurate and neat working impossible.

The adjustable belt pulley use in connection with the present invention is free from the aforementioned disadvantages. The belt supporting face remains circular running even in case of the greatest adjustment, and the disc can be adjusted while the machine is standing or while it is running.

The belt supporting face consists of a large number of lamellæ 32 which consists of plates of the required strength (Figures 1, 3, 4, 5, 6). The lamellæ 32 are provided with several square notches 33, as shown in Figure 5 representing a plate prepared for a lamella. In addition thereto the lamellæ are fitted with annular extensions 34 exactly opposite to the square notches. The extensions 34 of one lamella upon the disc being adjusted to the smallest diameter enter the angular notches 33 of the adjacent lamella.

The curvature of the arc part of the lamellæ corresponds to the curvature of the belt supporting face in case of the smallest adjustable diameter of the disc.

In consequence of the large number of lamellæ used, the arc-parts of them are very short and the difference of the height of arc of one arc-part from the belt supporting face of the disc with smallest diameter as compared with the same part from the belt supporting face of the pulley with largest diameter is only very small and when adjusting the pulley is balanced by the resiliency of the arc-parts.

By making the arc-parts according to the smallest diameter of the pulley it is achieved that they lie firmly pressed together in all positions of the diameters and hereby the belt supporting face becomes a perfect uniform one closed in itself and of the greatest resistance.

The object of the rectangular extensions 34 in conjunction with the rectangular notches 33 consists therein that an adjustment of the pulley to more than double the smallest diameter is possible without the belt supporting face loosening its connection as a whole.

The lamellæ 32 are on both sides fitted with threaded teeth 35 and are moved in the known manner in the body of the pulley 38 by the two threaded pulleys 36 and 37. The hubs of these pulleys are connected to each other.

One hub pulley 39 is connected to the body of the pulley 38 at the outer circumference.

In a second hub-pulley 40 which is also rigidly connected to the outer diameter of the body of the pulley 38 the rotating gear serving to adjust the pulley is arranged. This gearing consists of the two toothed rims 41 and 42 with inner teeth, several pairs of planet wheels 43 and 44 and the two central wheels 45 and 46. The toothed rim 41 is rigidly connected to the threaded pulley 36 and by means of the planet wheel 43 meshes with the central wheel 45. The inner toothed rim 42 is rigidly connected to the hub-pulley 40 and consequently also to the body of the pulley 38. Through the planet wheels 44 this toothed rim is engaged with the central wheel 46. The wheels of each of the planet wheel pairs 43 and 44 are rotatably mounted on a common axle and are guided between flat threaded pulley 36 and the hub-pulley 40.

To the central wheel 46 the casing 47 in which are housed the conical wheels 48 and 49 serving for adjustment is rigidly connected by means of coupling teeth 50. The toothed wheel 48 is in a rigid connection with the central wheel 45.

The shaft 18 on which the conical wheel 49 is mounted serves to adjust the gearing. At the same time the shaft 18 prevents the casing 47 from following the moving of the belt pulley.

If the belt pulley is rotated the two planet gearings not only roll uniformly on the central wheels 45 and 46 but also on the toothed rims 41 and 42 with inner gearing and no displacement occurs of the flat threaded pulleys 36 and 37 with regard to the pulley body 38 carrying the lamellæ of the pulley rim.

By a turning of the shaft 18 with the conical wheel 49 by means of the conical wheel 48 connected to the central wheel 45 however any desired displacement of the flat threaded pulley with regard to the pulley body 38 and thus any desired decrease or increase of the diameters during the standstill and during the running of the pulleys can be effected.

I claim as my invention:

1. In a device for producing a constant cutting speed for machine tools especially for lathes, a change speed gear for altering mechanically the number of revolutions of the working spindle, a second change speed gear connected to and controlling said first change speed gear and having means for altering constantly and automatically the ratio of transmission of the first change speed gear, and a gear connecting said second gear to the feeding spindle for the tool.

2. In a device for producing a constant cutting speed for machine tools especially for lathes, a change speed gear for altering mechanically the number of revolutions of the working spindle, a second change speed gear controlling said first change speed gear, two bevel gears connecting said change speed gears to one another, this second change speed gear consisting of two approximately conical drums with parallel axes and helical grooves and of two ropes placed into the grooves and adapted to transmit the movement of one drum on to the other, and a gear connecting said first drum to the feeding spindle for the tool.

3. In a device for producing a constant cutting speed for machine tools especially for lathes, a change speed gear for altering mechanically the number of revolutions of the working spindle, a second change speed gear controlling said first change speed gear, two bevel gears connecting said change speed gears to one another, this second change speed gear consisting of two approximately conical drums with parallel axes and helical grooves, a rope placed into the grooves and fastened with the ends to the largest diameters of the drums, a second rope also placed into the grooves of the drums, the ends of the latter rope being fastened to the smallest diameters of the drums, and a gear connecting said first drum to the feeding spindle for the tool.

4. In a device for producing a constant cutting speed for machine tools especially for lathes, a change speed gear for altering mechanically the number of revolutions of the working spindle, a second change speed gear controlling said first change speed gear, two bevel gears connecting said change speed gears to one another, this second change speed gear consisting of two approximately conical drums with parallel axes and helical grooves, a rope placed into the grooves and fastened with the ends to the largest diameters of the drums, a second rope also placed into the grooves of the drums, the ends of this rope being fastened to the smallest diameters of the drums, one of the drums being slidable on its axle and carrying a nut, a screw engaged by said nut, a transmitting device arranged between said screw and the other drum, the thread of the screw and of the nut having the same angle of inclination as the helical-shaped rope grooves on the drum, and a gear connecting the first of said drums to the feeding spindle for the tool.

5. In a device for producing a constant cutting speed for machine tools especially for lathes, a change speed gear for altering mechanically the number of revolutions of the working spindle, a second change speed gear controlling said first change speed gear, two bevel gears connecting said gears to one another, the first change speed gear containing an adjustable belt pulley, the rim of this pulley consisting of radially movable angular lamellæ, the outer shanks of the lamellæ being bent corresponding to the diameter of the pulley and capable of being placed on top of each other in a scale-like manner so that the outer bent shank of one lamella is supported by the radial shank of the adjacent lamella, and a gear connecting the second change speed gear to the feeding spindle for the tool.

6. In a device for producing a constant cutting speed for machine tools especially for lathes, a change speed gear for altering mechanically the number of revolutions of the working spindle, a second change speed gear controlling said first change speed gear, two bevel gears connecting said gears to one another, the first change speed gear containing an adjustable belt pulley, the rim of this pulley consisting of radially movable angular lamellæ, the outer and bent shanks of the lamellæ having several notches and projections, the projections of the one lamella being adapted to engage with the notches of the adjacent lamella when the belt pulley is adjusted to the smallest diameter, and the projections being adapted to support themselves on the radial shanks of the adjacent lamella when the belt pulley is adjusted to the largest diameter, and a gear connecting the second change speed gear to the feeding spindle for the tool.

7. In a device for producing a constant cutting speed for machine tools especially for lathes, a change speed gear for altering mechanically the number of revolutions of the working spindle, a second change speed gear controlling said first change speed gear, two bevel gears connecting said gears to one another, the first change speed gear containing an adjustable belt pulley, the rim of this pulley consisting of radially movable angular lamellæ, the outer shanks of the lamellæ being bent corresponding to the diameter of the pulley and capable of being pushed on top of each other like scales so that the outer and bent shank of one lamella is supported by the radial shank of the adjacent lamella, and the outer bent shank of every lamella being cranked in a radial direction by the thickness of the material, and a gear connecting the second change speed gear to the feeding spindle for the tool.

8. In a device for producing a constant cutting speed for machine tools especially for lathes a change speed gear for altering mechanically the number of revolutions of the working spindle, a second change speed gear controlling said first change speed gear, two bevel gears connecting said gears to one another, the first change speed gear containing an adjustable belt pulley, the rim of this pulley consisting of radially movable angular lamellæ, the outer shanks of the lamellæ being bent corresponding to the diameter of the pulley and capable of being slid on top of each other like scales so that the outer bent shank of one lamella is supported by the radial shank of the adjacent lamella, said lamellæ being on both sides of their radial part fitted with threaded teeth, two flat threaded pulleys engaged by said teeth, two toothed rims with inner gearing arranged adjacent to one of these pulleys, one of these toothed rims being rigidly connected to one of the flat threaded pulleys, a hub pulley fixed to the body of the belt pulley and to which the other toothed rim is connected, two central wheels supported on the shaft of the belt pulley, one of the central wheels being connected to the conical wheel driven by the second change speed gear of the device, a casing enclosing the conical wheel gearing and to which the other central wheel is connected, pairs of planet wheels arranged between the toothed rims with inner gearing and the central wheels, a common axle on which the wheels of every pair are rotatable independent of each other, the pairs of wheels being guided between one of the flat threaded pulleys and the hub pulley, and a gear connecting the second change speed gear to the feeding spindle for the tool.

In testimony whereof I have signed my name to this specification.

ERNST STÖCKEMANN.